No. 731,460. Patented June 23, 1903.

UNITED STATES PATENT OFFICE.

ADOLF ISRAEL AND OSCAR DRESSEL, OF ELBERFELD, GERMANY, ASSIGNORS TO FARBENFABRIKEN OF ELBERFELD CO., OF NEW YORK, N. Y., A CORPORATION OF NEW YORK.

BLUISH-VIOLET AZO DYE.

SPECIFICATION forming part of Letters Patent No. 731,460, dated June 23, 1903.

Application filed March 31, 1903. Serial No. 150,458. (No specimens.)

*To all whom it may concern:*

Be it known that we, ADOLF ISRAEL and OSCAR DRESSEL, doctors of philosophy, chemists, residing at Elberfeld, Germany, (assignors to the FARBENFABRIKEN OF ELBERFELD CO., of New York,) have invented a new and useful Improvement in Bluish-Violet Azo Dyes; and we hereby declare the following to be an exact and clear description of our invention.

Our invention relates to the production of a new monoazo dyestuff by first combining the diazo derivatives obtained from ortho-chloro-para-amidoacidylanilin, such as the diazo derivative of acetylchloro-para-phenylenediamin having the formula:

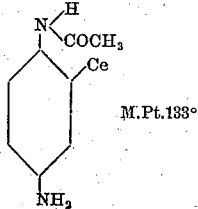

M.Pt.133° obtainable by reduction of ortho-chloro-para-nitroacetanilid (see *Annalen der Chemie*, Vol. 182, p. 108) with 1:8-dioxynaphthalene-3-6 disulfonic acid and then splitting off the "acidyl" by saponification. According to our researches the same dyestuff can also be prepared by first combining the diazotized meta-chloro-para-nitranilin (see *Annalen der Chemie*, Vol. 182, p. 106) with 1:8-dioxynaphthalene-3-6-disulfonic acid and then reducing the resulting monoazo dyestuff in an alkaline solution.

In carrying out our invention we can proceed as follows, the parts being by weight: 18.5 parts of acetylchloro-para-phenylenediamin having the above-given formula are diazotized, and the resulting diazo compound is added to a cold solution of thirty-two parts of 1:8-dioxynaphthalene-3-6-disulfonic acid mixed with an excess of sodium carbonate. After the reaction is completed one hundred parts of a sixty-per-cent. caustic-soda lye is added to the reaction mass, and it is heated to the boil in order to split off the acetyl group. The excess of caustic-soda lye is neutralized by means of hydrochloric acid, and the new coloring-matter is precipitated by the addition of common salt, filtered off, and dried. The dyestuff thus obtained is, in the shape of the sodium salt, a grayish-black powder soluble in water with a reddish-violet color, which turns red by the addition of dilute solutions of ammonia, caustic-soda lye, or sulfuric acid. It is soluble in concentrated sulfuric acid of 66° Baumé with a reddish-violet color, which is changed into yellowish red by the addition of a small quantity of ice, yellow flakes being precipitated by the addition of a larger quantity of ice.

The new coloring-matter dyes wool from acid-baths bluish-violet shades fast to light.

Having now described our invention, what we claim is—

The herein-described new azo dyestuff derived from chloro-para-phenylenediamin and 1:8-dioxynaphthalene 3:6 disulfonic acid, containing the chlorin atom in the molecule in meta position to the azo group, which dyestuff, in the shape of the sodium salt, is a grayish-black powder, soluble in water with a reddish-violet color turning red by addition of dilute solutions of ammonia, caustic-soda lye or sulfuric acid; being soluble in concentrated sulfuric acid of 66° Baumé with a reddish-violet color which is changed into yellowish red by addition of a small quantity of ice, yellow flakes being precipitated by the addition of a larger quantity of ice and dyeing wool from acid-baths bluish-violet shades fast to light, substantially as hereinbefore described.

In testimony whereof we have signed our names in the presence of two subscribing witnesses.

ADOLF ISRAEL.
OSCAR DRESSEL.

Witnesses:
OTTO KÖNIG,
ALBERT HEMSING.

It is hereby certified that in Letters Patent No. 731,460, granted June 23, 1903, upon the application of Adolph Israel and Oscar Dressel, of Eberfeld, Germany, for an improvement in "Bluish-Violet Azo Dyes," an error appears in the printed specification requiring correction, as follows:

On page 1, lines 17 to 24, the formula

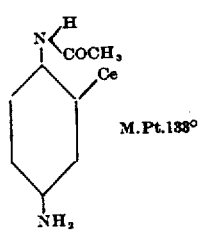 should read 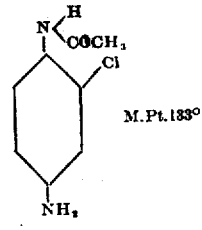

and that the said Letters Patent should be read with this correction therein that the same may conform to the record of the case in the Patent Office.

Signed and sealed this 14th day of July, A. D., 1903.

[SEAL.]

E. B. MOORE,
*Acting Commissioner of Patents.*